United States Patent Office 2,951,362
Patented Sept. 6, 1960

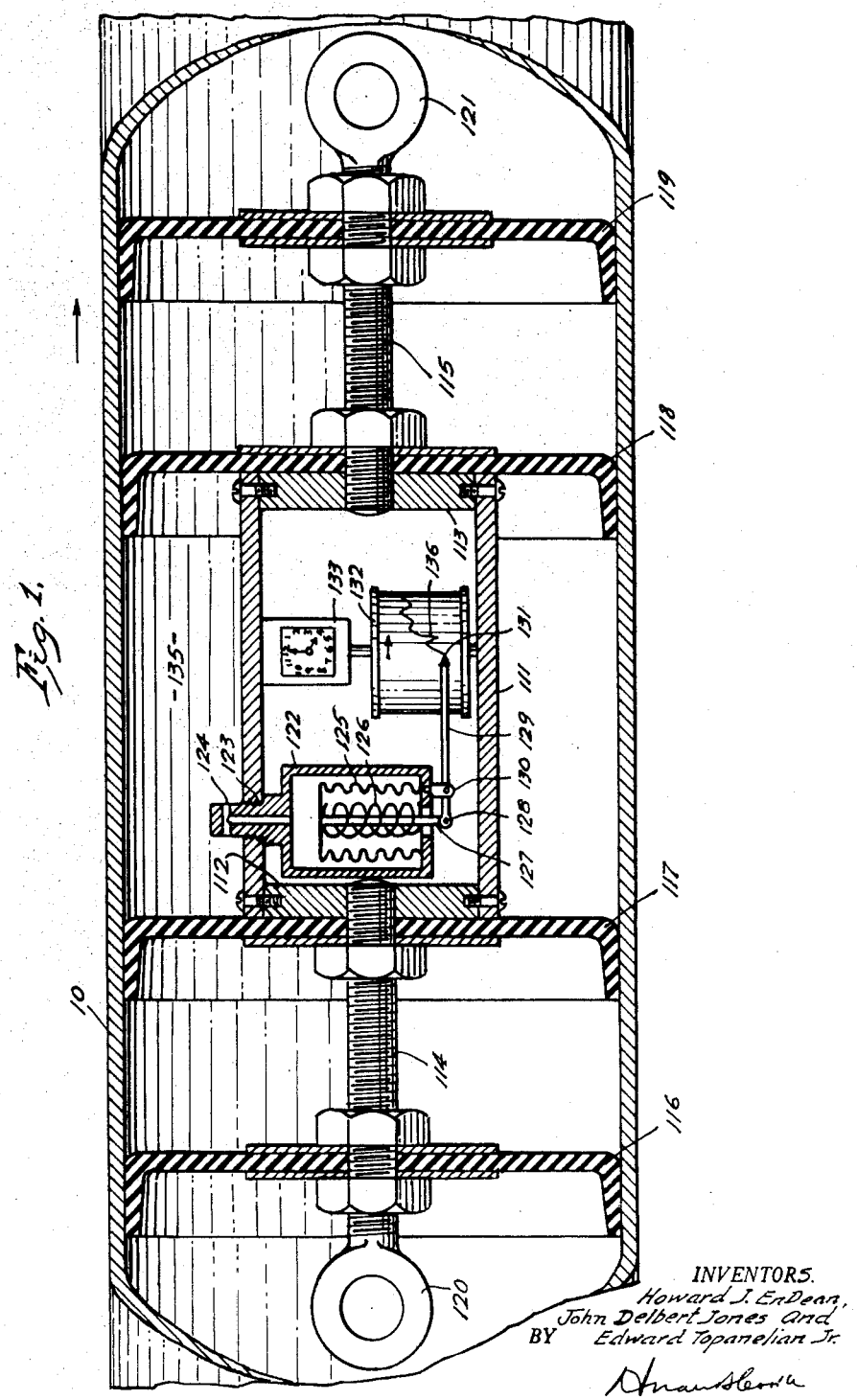

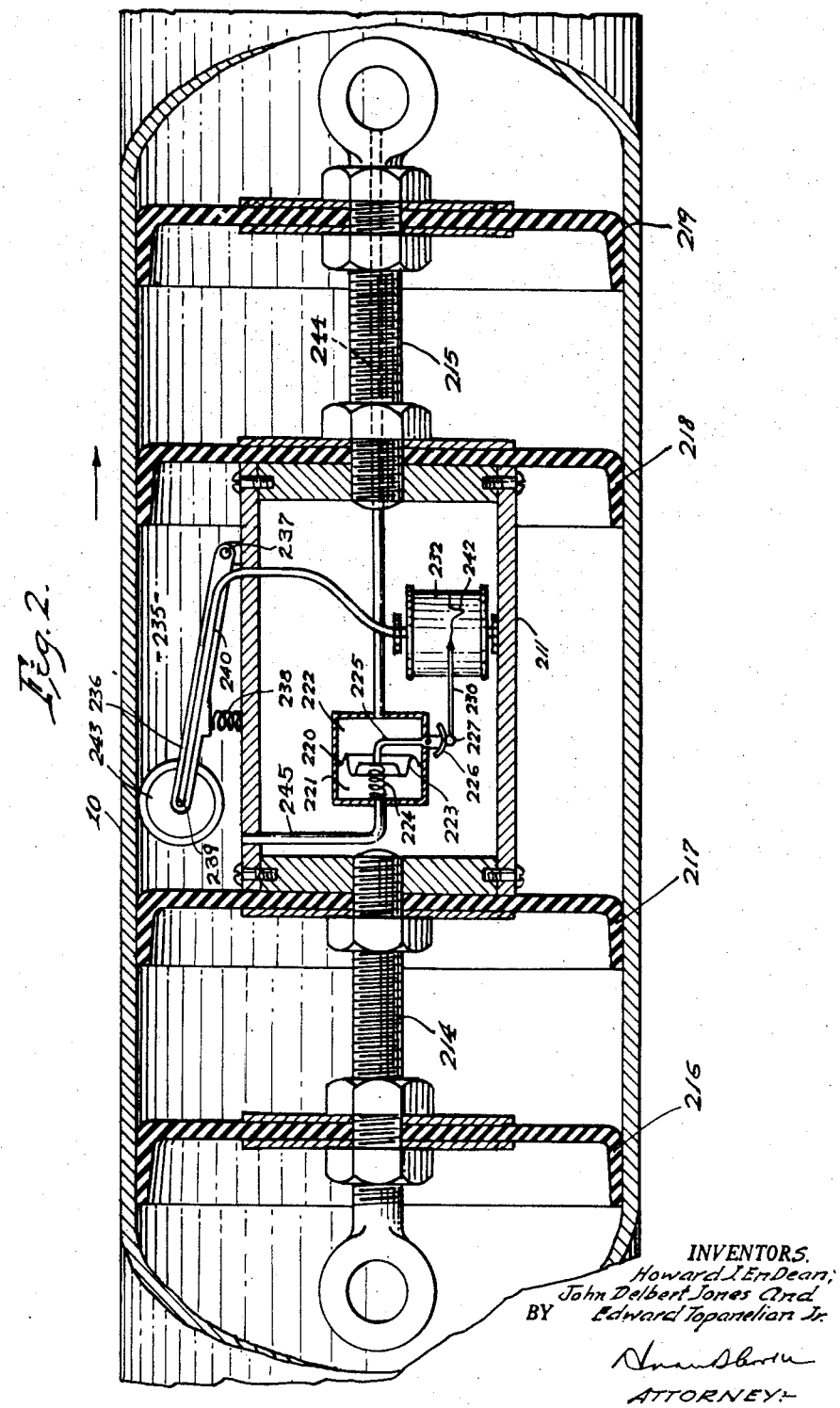

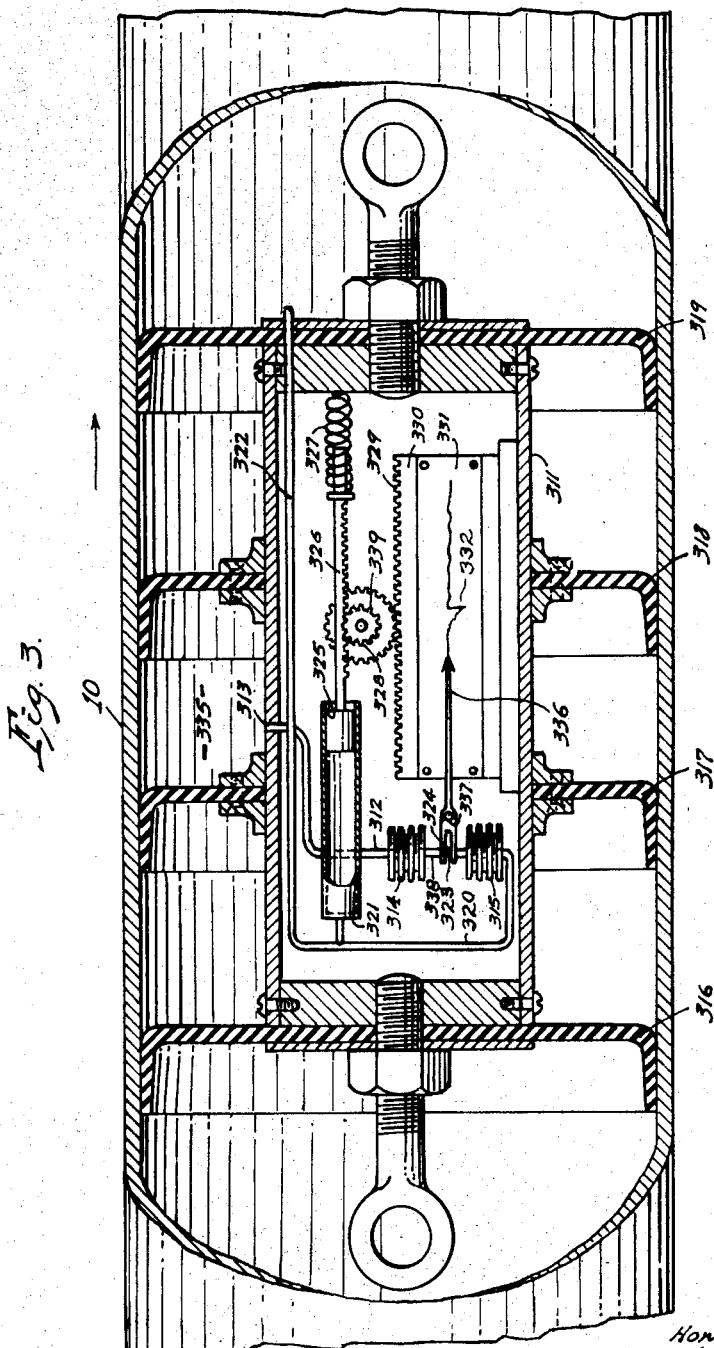

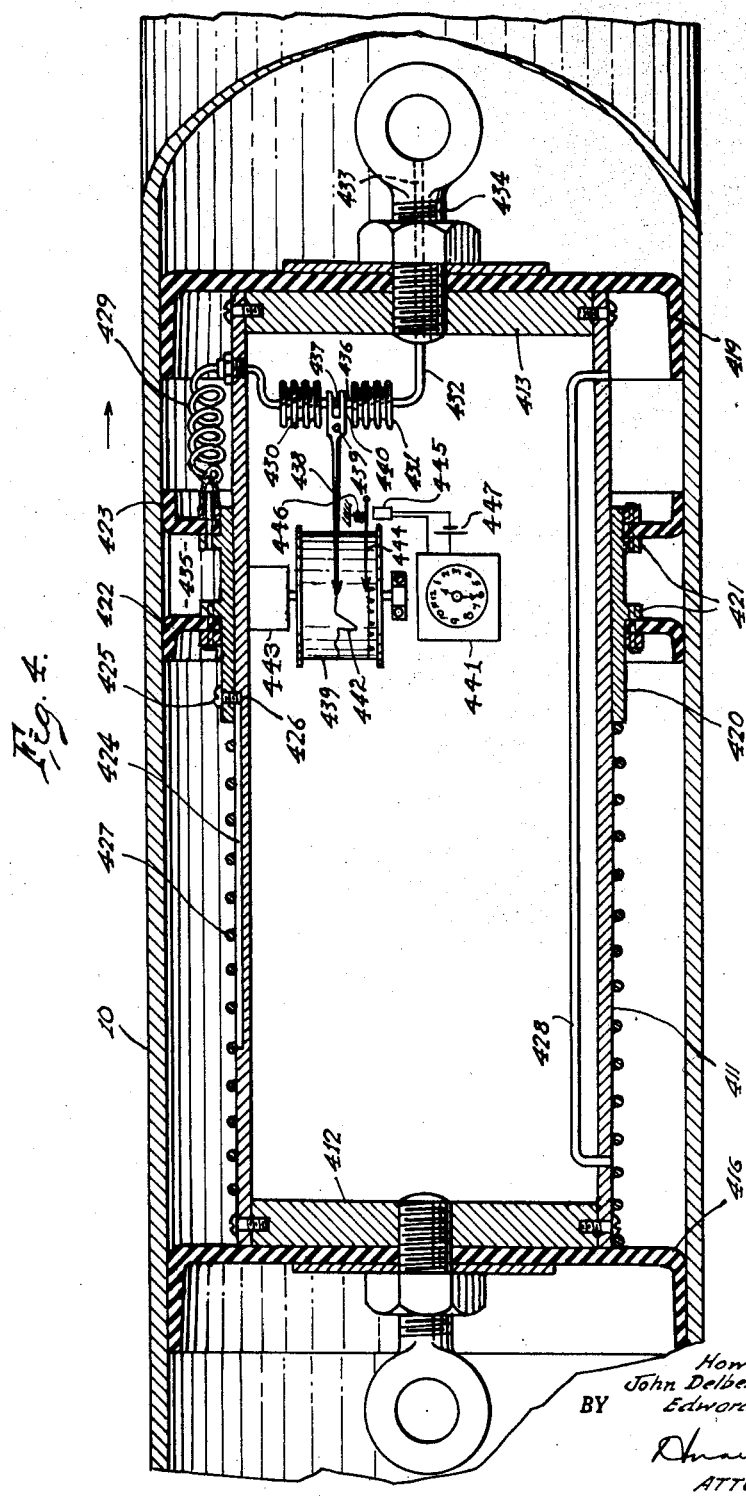

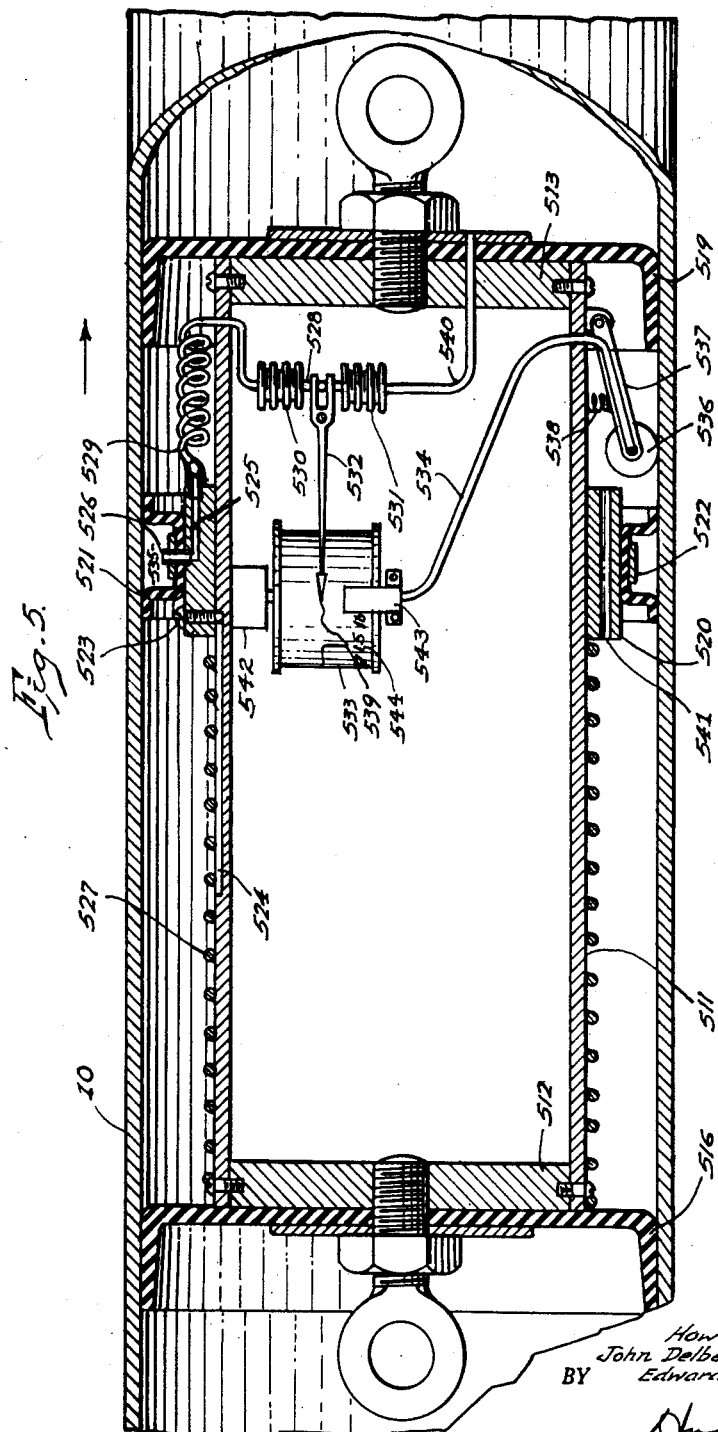

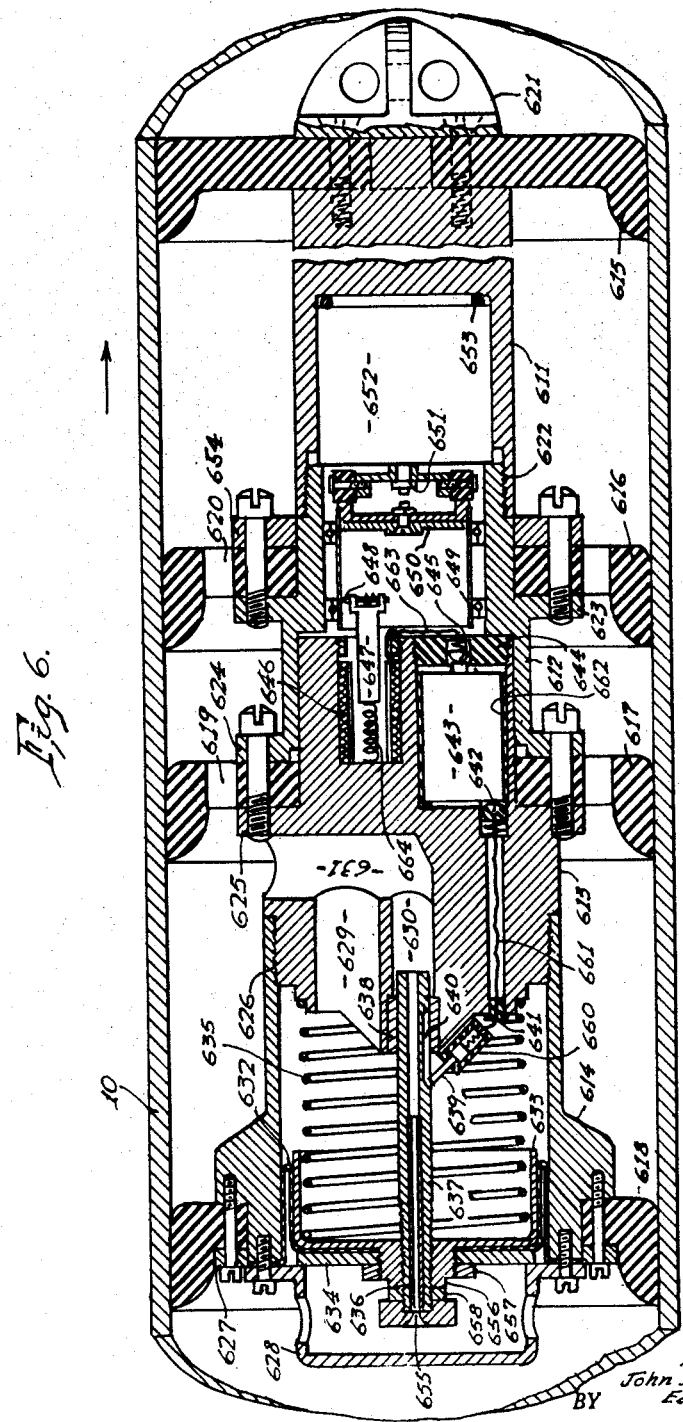

2,951,362

PIPELINE LEAK SURVEYING

Howard J. En Dean, Fox Chapel, Pa., John Delbert Jones, Tulsa, Okla., and Edward Topanelian, Jr., Pittsburgh, Pa., assignors to Gulf Research & Development Company, Pittsburgh, Pa., a corporation of Delaware Filed June 28, 1956, Ser. No. 594,482

3 Claims. (Cl. 73—40.5)

This invention concerns apparatus for making surveys in pipelines, and in particular concerns apparatus for locating leaks in a transportation pipeline to which access may be had to the inside only.

It is well known that pipelines occasionally develop leaks which are often times difficult to locate, particularly if the leak is small. Under certain conditions if the leak is of sufficient magnitude, it may be found by inspection of the surface of the ground as is customarily done by a pipeline walker or by aerial surveys. In general, the prior methods of locating leaks are expensive and have the disadvantage of being incapable of detecting small leaks until the amount of fluid which has leaked out of the pipeline becomes large enough to be recognizable by visual observation. Prior to visual recognition such small leaks may nevertheless cause expensive damages to crops, water supplies, etc., in addition to the loss of accumulated amounts of the transported material. Where pipelines are laid in tile, leaks may persist for long periods without detection and the location of surface evidence of the leak may not correspond with the location of the actual pipeline leak. Particularly in the case of pipelines for carrying oil, the oil is often corrosive and a pipeline otherwise in good condition may develop small leaks due to corrosion pitting. In the case of pipelines which carry refined petroleum products such as gasoline, the fire and explosion hazards which may result from a small leak are obvious and illustrate the necessity of promptly locating even small leaks in pipelines of this character. In this invention the pipeline is surveyed for leaks by transmitting through the pipeline an instrumentality capable of measuring a parameter which serves to indicate the presence and location of leaks.

In one embodiment of this invention wherein it is desired to locate leaks in a pipeline there is contemplated an apparatus whereby a small segment of pipeline is isolated and any failure of the isolated segment to maintain pressure is recorded. The apparatus which isolates a segment of the pipeline moves progressively through the pipe from one end to the other, and during its traverse it records the pressure in the region of isolation. This embodiment of the invention comprises carrier which may be inserted in a pipeline and which has flexible self-energized packers or flexible flanged washers which seal against the pipeline wall, and which carries a recording chart on which there is automatically recorded pressure variations of the fluid in the isolated segment of the pipeline lying between the packers.

In another embodiment of this invention the isolating packers are slidably mounted on the apparatus so that when a leak is encountered the isolating packers are temporarily retarded thereby giving increased sensitivity to the recording of small leaks.

In still another embodiment of this invention the pressure drop which occurs when a leak is encountered between the isolating packers is employed to actuate an electric contact whose circuit includes an electric marking device and thereby produces a mark on a recording drum.

It is accordingly an object of this invention to provide apparatus for locating leaks in a pipeline by isolating small sections thereof and observing the rate of change in pressure therein.

It is a further object of this invention to provide an apparatus for locating leaks in a pipeline which apparatus progressively isolates successive small sections of the pipeline and registers the effect of any leak which may be present in the section.

It is a further object of this invention to provide an apparatus which may be freely pumped from one end of a pipeline to the other and which progressively isolates successive sections of the pipeline and provides a record of pressure variations within such isolated sections of the pipeline.

It is a further object of this invention to provide an apparatus which is capable of detecting and locating small leaks in a pipeline whose outer surface is obscured.

It is a further object of this invention to provide an apparatus which may be freely pumped from one end of a pipeline to the other and which records pressure variations encountered during its traverse.

These and other useful objects are accomplished by this invention in the manner described in this specification of which the drawings form a part, and in which Figure 1 shows a diagrammatical view of an apparatus of this invention partly in section for measuring pressure inside an isolated segment of pipeline and for recording this as a function of traverse time;

Figure 2 shows a diagrammatical view of an apparatus of this invention for surveying the pressure differential between the pipeline and an isolated segment thereof and for recording this as a function of distance traversed;

Figure 3 shows a diagrammatical view of an apparatus of this invention for surveying the pressure differential between the pipeline and an isolated segment thereof and for recording this as a function of the local (gauge) pressure in the pipeline;

Figure 4 shows a diagrammatical view of an embodiment of this invention for the detection and recording of small leaks in a pipeline and simultaneously recording the traverse time;

Figure 5 shows a diagrammatical view of an embodiment of this invention useful for detecting small leaks in a pipeline and recording their occurrence as a function of traverse distance; and Figure 6 shows a diagrammatical view of an alternative embodiment of this invention useful for detecting small leaks in a pipeline and recording their occurrence as a function of traverse time.

Referring to Figure 1, 10 represents a pipeline the front side of which has been cut away to show the apparatus inside the pipeline. The apparatus comprises a tubular carrier 111 having end plates 112 and 113 which may be fastened to the tube 111 by means of screws as illustrated. The space inside the carrier is sealed to prevent entrance of pipeline fluids and will normally be filled with air at atmospheric pressure. Bolts 114 and 115 are threaded into the end plates 112 and 113 and each bolt carries one or more cup-shaped flexible packers 116, 117, 118 and 119. The packers comprise rubber cups clamped to the bolts as by means of nuts and washers as illustrated. The packers 117 and 118 form a sliding seal against the pipeline wall and serve as barriers or pistons which effectively isolate the segment or section of pipeline between them, the region of isolation progressing with motion of the apparatus. The bolts may have eyes 120 and 121 which form convenient aids for recovering the carrier should it accidentally become stuck in the pipeline, but the eyes 120 and 121 are not essential since the carrier may also be recovered by pushing it through with a succeeding carrier. The packers serve as the means by which the pumped fluid causes the carrier 111 to traverse the pipeline as well as serving to isolate a section of the pipe. The fluid pressure behind the rear packer must be sufficiently high to force the carrier or vehicle 111 through the pipe, i.e., it must exceed the pressure ahead of the forward packer by the amount required to overcome friction of the packers on the pipeline wall. Ordinarily this differential is quite small.

The purpose of the packers is to isolate a segment of pipeline 135 situated between inner packers 117 and 118. The apparatus is launched in the pipeline through a customary scraper trap and upon entering the pipeline is carried therethrough by the normal movement of the pumped liquid. The packer cups 116 and 117 face the same direction as do cups 118 and 119, thereby permitting easy forward (to the right in Figure 1) movement of the apparatus through the pipeline.

The space 135 between the two innermost packers 117 and 118 is effectively isolated. In the absence of leaks in the pipe 10 the space 135 will be pressurized to substantially the normal pipeline pressure at the particular location. Any sudden drop in the pressure of space 135 will be indicative of a leak in the isolated segment of pipeline between packers 117 and 118 as the apparatus moves along in the pipe 10.

Inside the carrier 111 the apparatus carries a pressure-measuring cell 122 which may conveniently be screwed into the wall of the carrier 111 as at 123. The interior of cell 122 is connected by means of T-shaped ducts 124 to the space 135 within the pipeline outside of carrier 111 and between the packers 117 and 118. The pressure-measuring cell 122 may be of a known type and is illustrated in the drawing as comprising a metallic bellows 125 acting against a compression spring 126. The free upper end of the bellows carries an arm 127 which is pivotally connected at 128 to a pen arm 129 which is pivotally supported on bracket 130. Pen 131 on the end of the arm 129 bears against a recording drum 132 which is driven by a clock 133. The drum 132 is provided with a recording chart so that the apparatus inside of the carrier 111 provides a time record of the pressure in space 135 as the device traverses the pipeline. The interior of the pressure cell 122 outside of the bellows is filled with pipeline liquid and the entrapment of air therein is avoided.

The normal pressure in the pipeline varies from that at the input end to that at the output end in a known manner, and in the absence of leaks the pressure in the region 135 between the inner packers 117 and 118 will substantially follow this pressure variation. However, due to the fact that the segment 135 is isolated from the rest of the pipeline, any leak encountered in the segment 135 will immediately lower the pressure therein. In pipelines which carry liquid this pressure drop is extremely rapid. The pressure drop due to a leak is recorded on the chart 132 as a kick 136 in the normal pressure-decline curve. The kick 136 generally has the form of sudden deflection of the record followed by a more or less gradual recovery to normal pressure. After the apparatus has traversed the entire length of pipeline it is again recovered in a scraper trap whereupon the record chart is removed and the presence of any such kicks as 136 noted. Inasmuch as the instrument traverses the pipeline at a rate determinable from the rate of fluid transport through the pipeline, its location at the time of any such kick is readily computed. The pipeline may then be dug up at this location and the leak repaired.

It is also possible to determine the location of a leak from the position of the leak kick 136 on the chart to other pressure variations caused by known encounters. These are produced when the instrument passes valves, changes in elevation, junctions, etc. whose location are of course accurately known from maps of the pipeline. By reference to the character and location of the pressure record produced at these known places the exact location of a leak may be readily determined.

While the drawing illustrates a particular type of pressure-measuring apparatus it is apparent that any type of device which will record the pressure in space 135 may be employed. In addition, the drum 132 may be replaced by a circular disk chart or a strip chart as is well known in the recording art.

In Figure 1 the record drum is shown as clock driven. It is however within the purview of this invention to drive the record drum by other means which are in some manner related to or which are correlatable with the position of the apparatus in its traverse of the pipeline. By way of example the drum may be driven by the pressure which declines gradually from the input end of the pipeline to the output end, or the drum may be driven by an odometer which progresses in proportion to the distance traversed by the apparatus. These will be described in more detail later in connection with the various subsequent figures.

Referring to Figure 2 there is shown in the pipeline 10 a carrier 211 similar to the carrier of Figure 1 and having packers 216, 217, 218 and 219 by means of which the carrier may be pumped through the pipeline. In Figure 2 the bolt 215 is drilled to form a duct 244 communicating with the fluid in the pipeline ahead of the carrier. The duct 244 is connected inside the carrier 211 to a capsule 220 which is divided into two compartments 221 and 222 by means of a flexible diaphragm 223. A spring 224 serves to keep the diaphragm centralized in the capsule. A duct 245 connects the compartment 221 to the space 235 between the packers 217 and 218. Care must be taken to fill both compartments 221 and 222 and their connecting ducts 244 and 245 with pipeline liquid and avoid trapping air. The pipeline liquid will remain in the ducts during operaton because the entire pipeline including the pipeline space between the packers is filled with pipeline liquid under superatmospheric pressure. The diaphragm 223 is pivotally connected to a rocker arm 225 which passes through the wall of the capsule and carries a quadrant gear 226 which engages a small pinion shaft 227. Motion of the diaphragm is thereby converted into rotation of the shaft 227 and this effects motion of the recording pen 230 across the record carried on drum 232. The ducts 244 and 245 are connected to the two compartments of the capsule 220 and the diaphragm thereby serves as a means for measuring the difference between the normal pipeline pressure and the pressure in the isolated space 235. Motion of the pen 230 transversely of the chart 232 will accordingly indicate this pressure difference and a kick in the recorded curve 242 will indicate a leak in the pipeline.

In Figure 2 the motion of the chart 232 is in proportion to the distance traversed by the device inside the pipeline. This is accomplished by means of a wheel 243 which rides against the inside wall of the pipeline and which is carried on an arm 236 pivoted to the carrier 211 at 237, the arm 236 being urged outward by the spring 238. Rotation of the axle 239 of the wheel is conveyed through suitable right-angle gearing to a flexible cable 240 which passes through the wall of the carrier and is connected to rotate the record drum 232 preferably through a gear reduction (not shown). Accordingly, the record produced by the apparatus in Figure 2 will be a chart on which the longitudinal coordinate is proportional to the distance traversed along the inside of the pipeline and the transverse coordinate of the recorded curve 242 is a measure of the pressure difference between the pipeline pressure and the pressure in space 235 as measured by the differential-pressure capsule 220. The device thus functions as a leak indicator in that the drop in pressure which occurs in the isolated segment 235 of the pipeline during the short interval of transient time that this segment includes the point of pipeline leakage, produces a sudden deflection of the diaphragm 223 and shows on the curve 242 as a transverse deflection similar to those produced in the operation of Figure 1.

Figure 3 shows a diagrammatical view of an embodiment of this invention in which the recording chart is driven by the pressure drop in the pipeline. Figure 3 is adapted to locate leaks in the pipeline by detecting the pressure drop in the region 335 between two packers in a manner similar to that of Figures 1 and 2. The carrier 311 is equipped with packers 316, 317, 318 and 319 in the same manner as previously described in connection with Figures 1 and 2. A tube 312 leads from an opening 313 in the wall of the carrier to one side of a differential pressure gauge. The differential pressure gauge comprises two opposing bellows 314 and 315, the interior of bellows 314 being connected by means of tube 312 to the space 335 whereas the interior of bellows 315 is connected by means of tubes 320 and 322 to the pipeline space ahead of the carrier. A mechanical linkage 338 connects the opposing ends of the two bellows, and a pin 323 on the linkage engages a fork 324 on the pen arm 336. The pen arm 336 is pivotally supported at 337. Any fluctuation of the pressure difference between that in the region 335 and the normal pipeline pressure will cause deflection of the recording pen arm 336 and is recorded. Motion of the pen 336 thus provides a record of the difference of pressure in the region 335 as compared with normal pressure. If in traversing the pipeline the apparatus encounters a leak, transit of the region 335 allows the pressure therein to drop below normal, such pressure drop will show as a kick 332 on the recorded curve.

Inasmuch as pressure in a pipeline varies in a continuous manner from the input end to the output end, there is a correspondence between absolute or gauge pressure (as distinguished from the differential pressure mentioned above) and location along the pipeline. This correspondence is employed in Figure 3 to determine the location of a leak. A cylinder 321 is connected to the fluid in the pipeline ahead of the device by means of tube 322. A piston 325 which has a close sliding fit in the cylinder 321 is connected to a rack 326 having a spring 327 under compression so as to push the piston into the cylinder. At the input end of the pipeline where the pressure is relatively high, the piston will be pushed to the outer end of the cylinder compressing spring 327. As the apparatus traverses the pipeline and the pressure in the line drops, expansion of the spring 327 against the gradually-falling pressure will permit the piston 325 to slowly travel to the other end of the cylinder 321. The rack 326 engages a small pinion 339 carrying on its shaft a larger gear 328 which in turn engages a rack 329 on a sliding carriage 330. The carriage 330 has fastened thereon a recording chart 331. The chart 331 thus moves through a larger distance than the piston 325, but its motion is nevertheless proportional to the pressure drop along the pipeline. Therefore the location of any leak causing a kick such as 332 on the curve may easily be computed from the position of the kick on the chart.

Referring to Figure 4 there is shown a diagrammatical cross-section of an embodiment of this invention having improved sensitivity for the detection of leaks. A cylindrical carrier 411 is sealed at the ends by end plates 412 and 413 and also carries at each end a flexible cup-shaped packer 416 and 419. An annular sliding carriage 420 is adapted to slide easily on the outside of the cylindrical case 411. The carriage 420 is equipped with spaced annular flanges 421 to which are attached annular packers 422 and 423. The packers 422 and 423 are clamped to the flanges 421 and sealed thereto so that the space 435 between the packers is effectively isolated. A groove 424 is cut part way through the wall of the carrier 411. A screw 425 is threaded into the carriage 420 and is reduced in diameter at its lower end to form a pin 426 which slides in the groove 424 thereby preventing rotation of the carriage 420. The limited length of the groove 424 allows a limited longitudinal sliding motion of the carriage 420. A helical compression spring 427 urges the carriage 420 into the forwardmost position on the carrier 411 as is permitted by the slot 424.

When the device of Figure 4 traverses the pipeline and a leak is encountered in the region 435 a pressure drop will occur in the annular space 435. The pressure drop due to the leak causes the packers 422 and 423 to firmly press against the wall of the pipe 10. In this way reduction in pressure due to a leak in the region 435 causes the carriage to stick to the pipe, and since it is slidably mounted on the carrier 411, the carrier 411 may move forward while the carriage 420 remains stuck to the location of the leak until the pin 426 reaches the rear end of the groove 424. The carriage 420 then again moves forward with the carrier 411, and gradually the carriage 420 returns to its normal position on the carrier 411 through the action of the spring 427. A bypass tube 428 connects the two annular spaces around the carrier 411 between the packers 416 and 419 respectively before and behind the carriage 420, so that the latter may move longitudinally on the carrier 411. The forward packer and flange 421 are drilled and the space 435 communicates by means of a flexible hose 429 with a bellows 430 inside of the carrier 411. A similar bellows 431 communicates by means of pipe 432 with a drilled hole 433 in the forward bolt 434 so as to connect bellows 431 with the pipeline fluid ahead of the device. The bellows 430 and 431 are mechanically interconnected by a rigid linkage 436 which carries a pin 437. A pen arm 438 pivoted at 439 has a fork 440 which engages the pin 437. Any pressure difference between the isolated region 435 and the region in the pipeline ahead of the carrier will effect motion of the pen arm 438 and be recorded. The pen 438 records on a drum 439 carrying a record chart and driven by a spring motor 443.

In the operation of the device in Figure 4 when the region 435 between the two packers 422 and 423 includes a leak in the pipeline 10 the carriage 420 sticks to the wall of the pipe, whereas the carriage 411 continues its forward motion. Because of the fact that the carrier 420 tarries at the leak, the drop in pressure is accentuated with the result that the record will show at 442 a substantial pressure drop at the time the leak is encountered. As soon as the carriage 420 reaches its rear limit of travel with respect to the carrier 411, the carriage is pushed past the point of leak and the pressure in region 435 gradually recovers to its normal value. Subsequently the spring 427 urges the carriage back into its normal forward position (as shown in Figure 4). Inasmuch as the apparatus may traverse the pipeline at the rate of several feet per second, the total time during which the leak is in communication with the region 435 is substantially larger than in the embodiment of Figure 1. Accordingly, the embodiment of Figure 4 is particularly adapted to detect and record leaks of small magnitude.

In order to determine the location corresponding to recorded leaks a clock 441 is provided having electric contacts which close at accurate intervals in the well known manner of a chronometer. A chronograph pen 444 having an electromagnet 445 and return spring 446 records on the chart 439 alongside of the pen 438. A battery 447 is connected in the series circuit comprising the chronometer contacts and the pen-deflecting magnet 445 so that at accurately-known intervals the pen 444 marks a pip which records the passage of the time interval. In this manner there is obtained the pressure-difference record and also an elapsed-time record so that correlation of these parameters is recorded. From this record the pipeline location corresponding to any desired point on the record may easily be calculated.

Figure 5 shows in diagrammatical cross-section a further embodiment of this invention in which the sensitivity is still further improved by the use of an annular isolating member whose total volume may be made small. The apparatus of Figure 5 comprises a cylindrical carrier 511 with sealed end plates 512 and 513 and having packers 516 and 519 as in the previously described embodiments. A carriage 520 in the form of a ring freely sliding on the outside of the carrier 511 carries a flexible annular cup 521 having an outwardly open U-shaped section. The cup 521 is held on the ring 520 by means of a strap 522 on its inner base as shown, the strap 522 being united at its ends by a toggle latch (not shown). The carriage 520 has a stop screw 523 whose lower end rides in slot 524 permitting the carriage limited longitudinal motion on the carrier 511. A spring 527 urges the carriage into its maximum forward position. The ring-shaped carriage 520 is drilled at 525 and has a nipple 526 which extends through a hole in the cup 521 and the strap 522. A flexible hose 529 connects with the hole 525 and transmits the pressure from the region 535 inside the cup to the bellows 530. A similar bellows 531 connects to the pipeline ahead of the carrier by means of tube 540 which passes through the forward end of the carrier. A linkage 528 connects the opposing ends of the bellows and carries a pin engaging the fork of the recording pen 532. Inasmuch as the annular space 535 may be made quite small, even a small leak in the pipeline will effect a substantial reduction in pressure in the region 535 causing the cup to adhere to the location and producing a substantial deflection of the pen 532. The carriage 520 is drilled at 541 to permit fluid between the carriage 520 and the packer 516 to bypass to the other side of the carriage so that the latter may freely slide on the carrier 511. When a leak is encountered by the cup 521 the pen 532 will record a sudden deflection which gradually returns to normal as illustrated at 539 in Figure 5.

The chart 533 on which the pen 532 records is driven by a spring motor 542. In order to determine the location corresponding to recorded leaks, a footage printer 543 is provided which prints footage numbers 544 on the chart 533 opposite the point of pen 532. The footage counter 543 is driven by means of a flexible drive cable 534 which passes through a sealed bushing in the housing 511 and engages an odometer wheel 536. Odometer wheel 536 is carried on an arm 537 and spring-pressed against the pipeline wall by means of spring 538. The distance traversed is thus recorded on the drum in known units so that the pressure-difference record is correlated with location.

Figure 6 shows a diagrammatical view of another embodiment of this invention in which high sensitivity for small leaks is attained. In Figure 6 the apparatus housing comprises four metal sections 611, 612, 613, and 614 each of which has a flexible packer 615, 616, 617, and 618. The packers 616 and 617 have one or more large openings 619 and 620 to permit ready flow of pipeline fluid past these packers. The forward packer 615 and the rear packer 618 form sliding seals against the wall of the pipe 10 so as to isolate the pipeline space between packers 615 and 618. The intermediate packers 616 and 617 are for the purpose of assisting in carrying the weight of the apparatus and thereby reduce wear on the end packers. If desired, the packers 616 and 617 may be omitted.

The forward packer 615 is clamped between a nose piece 621 and the closed forward end of cup-shaped housing section 611 by means of screws as shown. The housing section 612 screws into the section 611 at threads 622, a gasket seal (not shown) being provided to seal against entrance of pipeline fluid. The section 612 has a flange 623 to which the packer 616 is fastened by means of screws and an annular clamping ring 654. The section 612 is hollow, being slightly smaller in inside diameter than section 611 at its right-hand end, and having a larger inside diameter at its left-hand end, and terminates with a flange 624. Housing section 613 slips into the left-hand end of section 612 and has a flange 625. The packer 617 is clamped between flanges 624 and 625 by means of screws as shown. The packer 617, being resilient, also serves to seal the joint between sections 612 and 613. The housing section 614 screws on to section 613 by threads 626, no gasket being necessary at this joint. The rear packer 618 is clamped to section 614 by means of screws and an annular clamping ring 627 as shown. Section 614 is hollow and a perforated rear guard 628 covers the rear opening of section 614, but allows pipeline fluid access thereto. An eye bolt or other convenient retrieving means may be fastened to the rear guard 628 if desired.

The housing section 613 is drilled at 629, 630, and 631 so as to permit the pipeline fluid that is trapped between packers 615 and 618 access to the interior of housing section 614. The interior of section 614 is sealed at its rear end by means of a cylindrically-reentrant flexible diaphragm or bellows 632 which is made of plastic, rubber, or other flexible and fluid-impervious fabric. The outer end of bellows 632 is clamped between the end of housing section 614 and the flange of guard 628 as shown. The inner end of the bellows 632 is clamped between a metal spring-retaining cup 633 and a washer 634 by means of nut 657 on a threaded stem 656 of cup 633 as shown. A compressed spring 635 is placed between the cup 633 and a spring-retaining shoulder on housing section 613, the spring having only sufficient force to push the cup outward to its limit of motion but easily compressible by pipeline pressure. Outward movement of the bellows 632 is limited by the flange of guard 628 which is smaller in inside diameter than the outside diameter of washer 634. The space isolated between packers 615 and 618 is thus flexibly sealed by the bellows 632, except for a small opening 655 in a capillary tube 636 whose purpose will become evident.

A tubular plunger 637 is threaded into a tapped hole in the stem 656 and locked in place by a nut 658. The plunger 637 is free to slide longitudinally in a bushing 638, the latter being pressed into the hole 630 of housing section 613. The capillary tube 636 fits snugly inside the tubular plunger 637 against a shoulder on the inside bore of the plunger 637, and the tube 636 is held in place by a perforated cap nut 658 which screws on to the left-hand end of plunger 637. A path of very high flow resistance is thus provided through the hole in cap nut 658, the long capillary opening 655 and the bore of plunger 637, and this path serves to connect the otherwise isolated fluid in the space between packers 615 and 618 with the pipeline fluid behind the packer 618. It is thus apparent that if a leak in pipe 10 exists between the packers 615 and 618, the washer 634 and plunger 637 will be forced forward relative to the main body of the housing assembly by the pipeline fluid pressure acting against spring 635 whenever fluid in the isolated space leaks out of the pipeline. The flow resistance through the capillary tube 636 is sufficiently large that it has no appreciable effect on the motion of plunger 637 resulting from a leak in the pipeline between packers 615 and 618.

In order to detect motion of the plunger 637 an electrical circuit is provided in the section 613. This comprises a metal contactor 639 which is spring pressed toward the plunger 637 but provided with a stop so that at the limit of motion of contactor 639 it does not touch the plunger 637 because of a groove 640 milled in the plunger adjacent the contactor. The groove 640 is of such length that the contactor is but a short distance from the end thereof, so that upon slight forward movement of the plunger 637 the contactor 639 will electrically contact the plunger.

The contactor 639 is mounted on an insulating bracket 660 fastened to housing section 613 and is connected by an insulated wire 661 passing through sealed bushing 641 and a drilled hole in section 613 to an insulated spring-pressed contactor 642. The latter contacts the negative terminal (case) of a flashlight cell 643. The flashlight cell is enclosed in an insulating sheath 662 in a hole drilled in housing section 613. An insulating plug 644 with a contactor 645 connects to the positive terminal of flashlight cell 643. An insulated wire 663 leads from contact 645 to one terminal of a solenoid coil 646 whose other terminal is connected to the housing section 613. It is apparent that solenoid 646 is normally not energized because its electrical circuit is normally open at contact 639, but upon inward movement of plunger 637 the circuit is completed by contactor 639 contacting the plunger 637, whereupon the solenoid 646 is energized and pulls in its armature 647 against spring 664. Armature 647 is prevented from turning by conventional means (not shown) and carries at its outer end a stylus 648 which is spring-pressed against a chart on the inside surface of the hollow cylinder 649 the cylinder being free to rotate on needle bearings inside the housing section 612.

It is thus seen that as the device of Figure 6 traverses the pipeline, whenever a leak in pipe 10 is encountered between packers 615 and 618 the pipeline pressure forces the plunger 637 forward with respect to the housing assembly, thus closing the electrical circuit at contactor 639 and causing the stylus 648 to make a mark on the chart. The chart is clamped between the inside of cylinder 649 and an end closure 650 which has a fork or dog clutch to engage the shaft 651 of a clock motor 652. The clock motor 652 is clamped in the housing section 611 between its closed end and the housing section 612 with the aid of a resilient O-ring 653. The clock motor 652 thus rotates the chart-carrying cylinder 649. Provision may be made for the stylus 648 to draw a spiral line on the chart 649 in well-known manner if desired to lengthen the recorded record. The chart 649 thus provides a time record of the engagement of any leaks with device as it traverses the pipeline.

The device of Figure 6 is advantageous in that the deflection of the stylus and resulting mark produced on the chart is independent of the magnitude of the pipeline leak provided only that it is of sufficient size to effect movement of plunger 637 to close the electric contact during the time interval that the leak is between packers 615 and 618. The deflection of the stylus 648 is determined by the motion of the solenoid armature 647 which is independent of the size of the leak. When the device of Figure 6 has passed the leak, the spring 635 restores the plunger 637 to the non-contacting position by a small flow of pipeline fluid through the hole 655 in capillary 636. A rough indication of the magnitude of the pipeline leak may be inferred from the length of time that the stylus is deflected, i.e. the length of time required for the capillary flow to restore the plunger 637 to its initial non-contacting position.

The position of the leak along the pipeline traverse is determinable from the time that the mark is made on the chart compared to the total time of traverse as previously explained.

The sensitivity of the device of Figure 6 to small leaks may be improved by extending the distance between packers 615 and 618. This may be done for example by extending forward housing section 611 or by interposing additional sections of housing connected by a universal joint to permit ease of traversing bends in the pipe 10. It is apparent also that both the forward packer 615 and the rear packer 618 may comprise more than one packer to improve the seal against the inside of the pipeline and minimize the effect of wear.

The recording drums in the various figures have been shown in diagrammatical form only and it is apparent that they may be arranged on a screw thread so that the record makes a helical curve on the cylindrical surface of the drum as is well known in the recording art. Also the differential pressure gauge comprising opposing bellows may have additional mechanical linkages in order to improve sensitivity as is well known in the art, or other known types of pressure gauges may be used.

The apparatus of any of the embodiments shown is launched in the pipeline at the dispatching station through a customary scraper trap and upon entering the pipe is pumped therethrough by the normal movement of the fluid transported by the pipeline. After traversing the pipeline the apparatus is recovered at a scraper trap at the receiving end of the line whereupon the record chart is removed and examined. For the embodiments of Figures 2 and 5 the pipeline location corresponding to any desired point on the record is easily computed since the traverse distance is directly proportional to the length of record. For the embodiments of Figures 1, 4, and 6, the pipeline location corresponding to any desired point on the record may also easily be computed. If the pipe is of uniform diameter and the volumetric rate of pumping is uniform, then the distance from the dispatching station to the location corresponding to any desired point on the record bears the same ratio to the total length of traverse as the record time to the desired point bears to the time for the entire traverse. If the chart is driven at a uniform rate then these times are proportional to chart distances. For the embodiment of Figure 3 the pipeline distance corresponding to any desired point on the record bears the same ratio to the total distance of traverse as the pressure drop to the desired point bears to the total pressure drop for the entire traverse, but appropriate corrections should be made if the pipeline traverses hills and valleys as these will introduce pressure variations which are superimposed on the normal pressure drop and are easily calculated.

It is contemplated that prior to running the apparatus disclosed herein, one or more scrapers or other known cleaning devices may be pumped through the pipeline in order to prepare the pipeline for a survey. It is further contemplated that any of the devices shown herein may itself be equipped with one or more scraper sections if such is necessary to obtain a reliable survey. Furthermore, the number of packers used on the instrument carrier may be varied to suit conditions.

Certain aspects of this invention are disclosed and claimed in copending applications Serial Nos. 594,405; 594,483; 594,541 (now Patent No. 2,834,113); 594,577; 594,641 (now Patent No. 2,884,624); and 594,643; all of which are by the same applicants and are assigned to the assignee as the present application. Also certain aspects of this invention are claimed in divisional application Ser. No. 849,956 filed October 30, 1959.

What we claim as our invention is:

1. Apparatus for surveying a pipeline for leaks which comprises a vehicle insertable in the pipe, a pair of spaced flexible packers on said vehicle adapted to form a sliding seal against the wall of the pipe, a flexibly-sealed movable member slidably mounted on said vehicle exposed on one side to fluid in the space intermediate said packers and on the other side to fluid inside the pipe outside said packers, a sealed housing on said vehicle, recording means including a record chart in said housing, electric contact means on said vehicle adapted to be closed by movement of said slidable member, electric circuit means on said vehicle including a current source connected to said electric contact means and to said recording means whereby said recording chart is marked whenever said contact means is closed, and means in said housing for moving said record chart.

2. Apparatus for surveying a pipeline for leaks which comprises a vehicle insertable in the pipe, a pair of spaced flexible packers on said vehicle adapted to form a sliding seal against the wall of the pipe, a flexibly-sealed movable member slidably mounted on said vehicle exposed on one side to fluid in the space intermediate said packers and on the other side to fluid inside the pipe outside said packers, a sealed housing on said vehicle, recording means in said housing, said recording means including a record chart and means for longitudinally moving said record chart and a stylus contacting said recording chart and adapted to transversely mark said chart, a solenoid actuating said stylus, a source of electric current on said vehicle, electric contact means on said vehicle adapted to be actuated by movement of said slidable member, and electric circuit means on said vehicle including said current source and said solenoid and said contact means.

3. Apparatus for surveying a pipeline for leaks which comprises a vehicle insertable in the pipe, a pair of spaced flexible packers on said vehicle adapted to form a sliding seal against the wall of the pipe, a cylindrically reentrant diaphragm on said vehicle exposed on one side to fluid in the space intermediate said packers and on the other side to fluid inside the pipe outside said packers, a tubular plunger connected to said diaphragm, a capillary duct in said plunger affording restricted communication between the space intermediate said packers and the pipeline space outside said packers, a spring urging said diaphragm outward from the space intermediate said packers, a stop to limit outward motion of said diaphragm, a sealed housing on said vehicle, recording means in said housing, said recording means including a recording chart and means for longitudinally moving said recording chart and a stylus contacting said recording chart and adapted to mark said chart, a solenoid actuating said stylus, a source of electric current on said vehicle, electric contact means cooperating with said plunger and adapted to be actuated by movement thereof, and electric circuit means on said vehicle including said current source and said solenoid and said contact means.

References Cited in the file of this patent

UNITED STATES PATENTS

| | | |
|---|---|---|
| 2,192,155 | Schuldt | Feb. 27, 1940 |
| 2,665,187 | Kinley et al. | Jan. 5, 1954 |
| 2,701,960 | Irwin | Feb. 15, 1955 |
| 2,782,370 | Ver Nooy | Feb. 19, 1957 |